(12) United States Patent
Cheng

(10) Patent No.: US 6,760,281 B2
(45) Date of Patent: Jul. 6, 2004

(54) PUSH-BUTTON SPEED CHANGE DEVICE FOR CD ROM DRIVE

(75) Inventor: Ming-Kuei Cheng, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 238 days.

(21) Appl. No.: 09/899,139

(22) Filed: Jul. 6, 2001

(65) Prior Publication Data

US 2003/0007429 A1 Jan. 9, 2003

(51) Int. Cl.[7] ............................................... G11B 21/08
(52) U.S. Cl. .................................. 369/30.27; 369/33.01
(58) Field of Search .......................... 369/30.27, 30.26, 369/47.38, 47.39, 47.55, 53.3, 53.43, 53.37, 33.01

(56) References Cited

U.S. PATENT DOCUMENTS

| | | | | |
|---|---|---|---|---|
| 5,220,551 A | * | 6/1993 | Tateishi et al. | 369/30.27 |
| 5,363,355 A | * | 11/1994 | Takagi | 369/30.27 |
| 5,420,839 A | * | 5/1995 | Tateishi | 369/30.27 |
| 5,590,106 A | * | 12/1996 | Shimizume et al. | 369/30.27 |
| 5,870,355 A | * | 2/1999 | Fujihara | 369/30.27 |
| 5,910,933 A | * | 6/1999 | Moore | 369/30.27 |
| 5,910,934 A | * | 6/1999 | Shimizume | 369/50 |
| 5,917,782 A | * | 6/1999 | Kim et al. | 369/30.23 |
| 6,226,237 B1 | * | 5/2001 | Chan et al. | 369/30.27 |

FOREIGN PATENT DOCUMENTS

| | | | | | |
|---|---|---|---|---|---|
| JP | 6-12773 A | * | 1/1994 | | 369/30.27 |
| JP | 6-139716 A | * | 5/1994 | | 369/30.27 |
| JP | 11-144367 A | * | 5/1999 | | 369/30.27 |

* cited by examiner

Primary Examiner—Tan Dinh
(74) Attorney, Agent, or Firm—Rosenberg, Klein & Lee

(57) ABSTRACT

A push-button speed change device for CD ROM drive is included in a CD ROM drive having a system casing and a front panel, and the front panel has indicating light, CD loader, and a plurality of control buttons. By means of each control button, it individually controls the play, pause, fast forward, fast reverse, of the optical disk drive, or when the user simultaneously presses any two of the control buttons, it can control the optical disk drive to rotate the motor in different speeds.

1 Claim, 1 Drawing Sheet

__US 6,760,281 B2__

PUSH-BUTTON SPEED CHANGE DEVICE FOR CD ROM DRIVE

BACKGROUND OF THE INVENTION

1. Field of the Invention

The present invention relates to a push-button speed change device for CD ROM drive, more particularly to a push button being disposed on the front panel of the optical disk drive for the user to simultaneously press any two control keys to control the optical drive to drive the motor in different speeds.

2. Description of the Prior Art

CD ROM drives are widely used in computers and electric appliances to read the CD and DVD drive signals. Since the data storage capacity is larger than the traditional magnetic tape storage media, and the volume of the CD and DVD drive is compact and easy to store, they become the mainstream products in the market in no time. In the early stage, the speed of reading data on the CD ROM drive is 2× or 4×, and the recent development allows a speed of the commercialized speed of 40×, 50× or even up to 60×. The new CD ROM drive replaces the old in an amazingly fast pace, especially in the current popular multimedia computer market, the fast CD ROM drive has become the standard equipment for the personal computers, home computers, and network workstation.

The accuracy of data access is the most important index of the quality of the optical disk. Although there is a breakthrough in the optical component specifications and the key technologies for the motor and the optical head, yet the optical disk experiences vibration due to its high speed. When using a disk of inferior quality, the bias gravitation will give rise to vibrations and unstable phenomenon due to the fast rotary movement, and further will affect the reading of the optical head that results in reading error or reading failure, and influences the reliability of CD ROM drive. Furthermore, the fast rotation of the optical disk causes noises, which is a common irritating problem to end-users, and such problem awaits effective solutions.

SUMMARY OF THE INVENTION

Therefore, the primary objective of the present invention is to provide a CD ROM drive that has the capability of changing speeds, and the speed change control buttons are disposed on the front panel of the optical disk. The user may press the control buttons to control the CD to drive the motor at different speeds depending on the actual needs. The CD can be rotated at different speeds that can collaborate with the optical head and attain the purpose of accessing data in a reliable and accurate manner.

A further objective of the present invention is to provide a CD ROM drive push-button speed change device, which can change the rotary speed of the optical disk by controlling the push-button on the front panel of the CD ROM drive. These buttons are the currently existing playing buttons, and they do not require any modification of the front panel.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
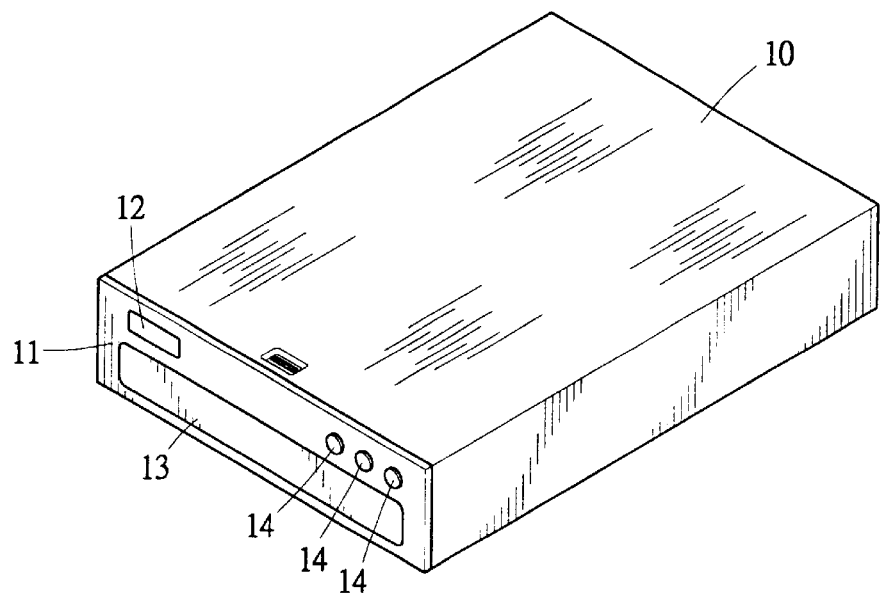
FIG. 1 shows an optical disk having the push-button speed change device according to the present invention.

Please refer to FIG. 1 for the CD ROM drive push-button speed change device according to the present invention, which is disposed on a front panel 11 of a CD ROM drive 10 to control the motor of the optical disk drive to rotate at different speed.

The CD ROM drive 10 comprises a front panel 11, on which an indicating light 12, an optical disk loader 13, and a plurality of control buttons 14, wherein the indicating light 12 is used to display the power supply and the BUSY light signal when accessing data. The optical disk loader 13 is used for accommodating the optical disk and being sent into the interior of the system casing 11. The motor causes the optical disk to rotate while the optical head is reading data. The plurality of control buttons 14 is used to control the play, pause, fast forward, fast reverse functions of the optical disk drive.

Figure 2:
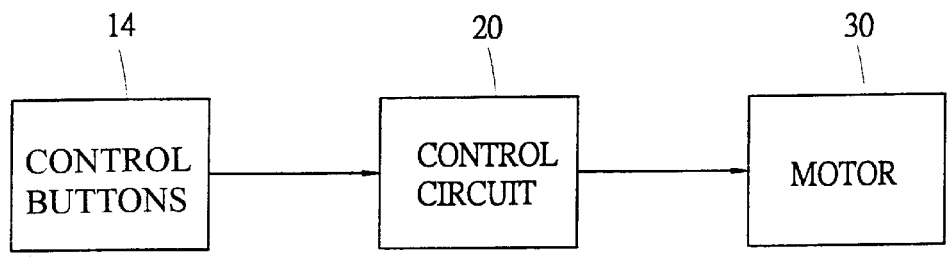
FIG. 2 is a block diagram showing the system architecture of the present invention.

In FIG. 2, the push-button speed change device of the CD ROM drive has a basic structure comprising a control circuit 20, which control the optical disk drive to drive the motor at different speeds by the above-mentioned control button 14.

To differentiate the control function of each control button 14, the user can use any two of the plurality of the control buttons for the design to conduct the control circuit 20 in order to drive the motor according to the control of the speed change, and control the motor 30 of the optical disk drive to reduce its rotary speed or resume the original rotary speed.

The foregoing rotary speed control can be designed as a multi-sectional mode. For example, whenever the user presses the two control buttons 14, the control circuit 20 will reduce the rotary speed of the motor 30 of the optical disk drive by 5% for each press, and the buttons can be pressed for a consecutive three times for the speed reduction. When the buttons are pressed for the fourth time, the motor will resume its original rotary speed.

In practical applications, the user can use the device according to the present invention to mechanically change the rotary speed of the CD ROM drive. When the data access of the optical disk drive is unstable, the user can press the control button to reduce the speed of the motor to another speed to collaborate with the data access until it reads data stably and accurately, and attains the predetermined purpose.

Furthermore, the CD ROM drive push-button speed change device of the present invention is designed with control buttons which are disposed on the front panel of the optical disk for controlling the rotary speed of the disk. The control buttons leverage the already existing play buttons. IT is not necessary to modify the external look of the front panel.

The push-button speed change device for CD ROM drive according to the present invention integrates the already existing control buttons on the front panel of the optical disk with the rotary speed control circuit to enable the CD ROM drive to be capable of changing the rotary speed of the disk. Such arrangement can reduce the motor of the optical disk to different speeds to collaborate with the optical head such that it attains the purposes of low vibration, low noise, and high reading capability.

What is claimed is:

1. A push-button speed change device for a CD ROM drive disposed on a front panel of the CD ROM drive for controlling a motor of the optical disk drive to rotate at different speeds, and said CD ROM drive comprising an indicating light, a CD loader, and at least two control buttons for controlling operation of said CD ROM drive; characterized in that:

said push-button speed change device for a CD ROM drive comprises a control circuit having an output coupled to the motor of the optical disk drive for controlling the motor to rotate at different speeds and resume to the original rotary speed, said at least two control buttons being coupled to an input of said control circuit, said rotary speed being reduced or returned to the original rotary speed responsive to said at least two control buttons being operated simultaneously.

* * * * *